Dec. 20, 1966 D. L. BITTNER ETAL 3,292,667
PRECISION FLUID METERING DEVICE
Filed Dec. 12, 1963
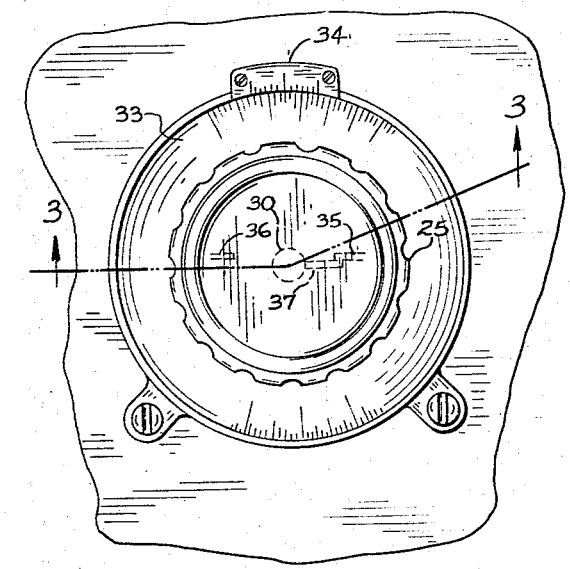
Fig. 2
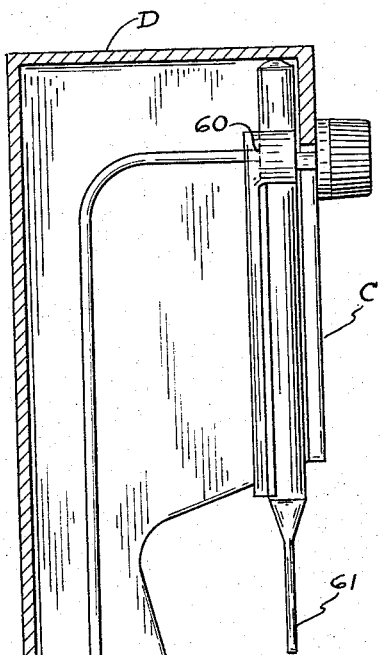
Fig. 1
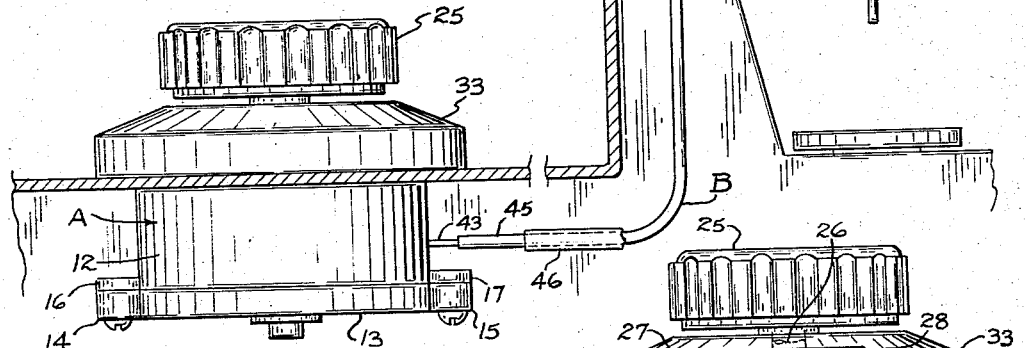
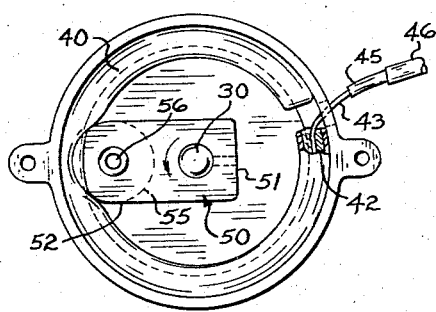
Fig. 4
Fig. 3
INVENTORS
DONALD L. BITTNER
COLIN D. MURDOCH
BY
Townsend and Townsend
ATTORNEYS United States Patent Office 3,292,667
Patented Dec. 20, 1966

3,292,667
PRECISION FLUID METERING DEVICE
Donald L. Bittner, 2200 Hayes St., San Francisco, Calif. 94117, and Colin D. Murdoch, San Leandro, Calif.; said Murdoch assignor to said Bittner
Filed Dec. 12, 1963, Ser. No. 330,041
1 Claim. (Cl. 141—25)

This invention relates to the metering and dispensing of fluids and more particularly relates to a new and useful device for metering precise quantities of fluid for titration tests.

In various analytical chemical tests it is necessary to add precise quantities of a known solution to a test sample of unknown solution in order to determine the chemical make up and strength of this unknown solution. The problems of precisely measuring the quantity of known solution are especially important in analysis which deal with the range of micro-equivalents.

In the past the precise metering has been obtained by means of devices having a mercury bead or pool gravitationally resting at the lowermost portions of a downwardly depending curved passageway to form at least one variable volume chamber between the mercury and the end of the passageway. Systems of this type are described in U.S. patent application Serial No. 42,106, filed July 11, 1960, now Patent No. 3,182,692, by Donald L. Bittner. As the curved passageway was rocked the mercury bead or pool flowed under the influence of gravity to always remain at a lowermost portion of the tube. As a result of mercury movement, the volume of space between one side of the mercury and the passageway end was decreased to push air through a conduit into a fluid storage vessel and displace a predetermined amount of fluid for discharge into a solution to be tested. A disadvantage of using mercury is that it tended to react with certain chemicals, such as chlorine, thereby limiting the adaptability of the system and creating a possible source of contamination. In addition, the mercury could run out of the passageway if the device was tilted too far.

Another system has been to use a sliding pinch clamp which was connected to squeeze the resilient tube between a pair of spaced apart rollers. As the tube was drawn through the rollers air was forced from one side of the tube into a liquid storage chamber or pipette for discharging a certain portion of the fluid from the lower end thereof. A disadvantage of this system was that the resilient tubing was unprotected and easily subjected to movement and accidental or uncontrolled deformation which could change the volume of the space within the tube causing imprecise fluid discharge. In addition, it was very difficult to obtain a precise measurement of the amount of air displaced from the resilient hose for each increment of roller travel, since incremental volume change of the tube passageway would tend to vary non-linearly with incremental roller movement.

An object of this invention is to provide a fluid metering device in which a predetermined increment of rotation of a calibrated dial will cause a roller to travel along a resilient hose or flexible tube a precise distance to force a precise amount of air from the resilient hose into a fluid container for subsequent discharge of a precise amount of fluid therefrom.

Another object of this invention is to provide a fluid metering device of the above type in which the resilient hose is mounted within a cylindrical housing and in which a roller is adapted to travel along said hose to progressively flatten a short hose length to displace air or force air through one hose end.

A feature and advantage of this arrangement resides in the fact that the cylindrical housing maintains the hose in the same curvature at all times and that only a predetermined and controlled portion of the resilient hose is flattened for each increment of roller travel resulting in precise volumetric changes in the bore space.

Still another advantage of this invention resides in the fact that hose creep caused by the roller flattening the resilient material is substantially compensated for by loosely mounting the resilient hose within or along the bore of the cylindrical housing and that by using a single roller any hose creep is non-cumulative in effect.

Another object of this invention is to provide a metering device of the above type in which the travel of the roller is limited to a predetermined length of hose and does not overrun either end thereof.

Still another object of this invention is to provide a metering device of the above type in which the cylindrical housing bore includes a pair of lands positioned along each edge to provide a central groove and in which the roller extends part way into the groove whereby the resilient hose is held within the groove and centered under the cylindrical roller means thereby insuring that the entire cross-section of the hose is flattened by the roller and that the longitudinal axis of the flattened hose is always aligned with the direction of roller travel.

Another object of this invention is to provide a fluid metering device in which a conduit communicating with one end of the resilient hose and with a source of fluid is shielded and has a passageway with a cross-sectional area not greater than $1/10$ the cross-sectional area of the resilient hose inside diameter. The advantage of this arrangement resides in the fact that flexure or deformation of the exposed conduit will only cause negligible or minute volumetric changes in air displacement relative to the controlled air displacement caused by the roller flattening action on the enlarged diameter hose.

Other objects, features, and advantages of this invention will become apparent upon reading the following detailed dscription of one embodiment of the invention and referring to the accompanying drawings in which:

FIGURE 1 is a side elevational schematic view of one system in which the invention can be used;

FIGURE 2 is a top plan view of the dial portion of FIGURE 1;

FIGURE 3 is a partial cross-sectional view taken along the lines 3—3 of FIGURE 2 and showing the roller relationship to the resilient hose; and FIGURE 4 is a bottom plan view with the cylindrical housing cap partially broken away to show the relationship of the rotatable roller flattening the resilient hose for air metering action.

Referring now to the drawings there is illustrated schematically in FIGURE 1 an air metering pump A having a calibrated dial. By turning this dial a precise distance, a precise linearly related quantity of air is forced through conduit B into the upper end of the fluid storage vessel C to displace a precise quantity of the fluid contained therein. The precise amount of fluid ejected through the lower end outlet orifice is linearly related to the amount of air added to the top of fluid storage vessels. For purposes of illustration, a support frame D has been shown as interconnecting each of the parts but it is to be understood that a more sophisticated structure can be readily used and that the specific structure is only meant to be representative.

Now referring to the details of the drawing, there is illustrated a metering pump A including a cylindrical housing 12 having an end cap 13 secured to the lower end thereof. Machine screws extend through cap ears 14 and 15 and into the corresponding housing ears 16 and 17. The interior of cylindrical housing 12 is hollowed out to form a smooth cylindrical bore 18. A land 19 rings the innermost edge of bore 18. Although a corresponding land is not formed integrally with the outermost bore edge, end cap 13 does have a ring-like flange 20 formed along its inner surface which acts as a matching land when the end cap is fastened in place. The width and height of flange 20 are identical to the corresponding dimensions of land 19 so as to act as a matching land when cap 13 is secured in place.

Rotation of dial knob 25 rotates shaft 26 driving the gear train, illustrated schematically as double gears 27, 28, and 29, through predetermined arcs of rotation. It should, of course, be understood that this gearing arrangement is only meant to be a schematic illustration and that other possible arrangements can be used such as a step-down spur gear or even a direct coupling. As the lower beveled elliptical gear 29 rotates, the drive shaft 30 secured thereto is also rotated.

Drive shaft 30 is in turn rotatably mounted to extend through an aperture in frame D and is journaled through the aligned bearing apertures 31 and 32 formed along the axis of cylindrical housing 12. Upper bearing aperture 31 is formed in the end wall of the cylindrical housing while lower bearing aperture 32 is formed through end cap 13.

Referring back to the dial, the rotatable housing 33 can be provided with appropriate indicia or calibration lines. A vernier scale 34 can be mounted adjacent the main dial scale to provide accurate measurement for small increments of rotation of main housing 33. Stop pins 35 and 36 are provided within dial housing 33 to contact member 37 on drive shaft 30 thereby limiting the rotation of the shaft.

Now referring back to air metering pump A, a resilient hose 40 is mounted loosely to extend along the periphery of the smooth bore 18. Types of material which can be used for the hose include rubber, plastic and any other airtight resilient material. For reasons to be explained shortly, the hose 40 is sized to have a circumference slightly less than twice the distance between lands 19 and 20. Thus it can be seen that the two lands 19 and 20 operate to effectively hold or maintain the hose 40 in a somewhat centered position along the smooth bore 18. One end of resilient hose 40 communicates with the atmosphere while the other end is plugged by an apertured metal plug 42 inserted therein. A small diameter pipe 43 is secured to plug 42 and provides a path for fluid communication, through the plug aperture, with the interior of resilient hose 40. In order to remove this small diameter pipe 43 from the housing interior, an aperture is formed through the bore wall.

Before continuing with the discussion of air metering pump A, the air circuit exterior of the pump will be described. Accordingly, the small diameter pipe 43 is in turn connected to the end of a small diameter flexible conduit 45. Since conduit 45 is located outside of housing 12 and is unprotected it is necessary to make it of sufficiently small diameter that flexure deformation or any other physical forces applied to it will not cause a substantial volumetric change in its passageway. By making the diameter of the conduit passageway no greater than one-tenth the size of the interior of resilient hose 40, the accuracy of the system is not greatly affected by slight changes in the conduit passageway size. In addition, conduit 45 can be encased in a shielding sleeve 46 which will receive the major share of the punishment from outside physical forces thereby protecting the inner conduit.

Now referring back to the interior of air metering pump A, a radially extending arm 50 is secured to rotatable drive shaft 30 by means of a set screw 51. One end of arm 50 is channeled to form a pair of parallel spaced apart ears 52 and 53. The interior faces of the ears are spaced apart a distance to receive roller 55 therebetween. The top edges of each ear are spaced slightly inward of the lands and shaped to match the curvature of the lands.

A cylindrical roller 55 is rotatably mounted between the two ears 52 and 53 by means of axle pin 56 extending through two aligned apertures, one in each ear. Cylindrical roller 55 rotates about an axis paralleling the smooth bore 18 and is spaced sufficiently interior of the smooth bore surface that the peripheral surface of the roller face extends into the spacing between lands 19 and 20 to a point spaced from the smooth bore at a distance not greater than twice the thickness of the hose wall. In addition, the width of roller 55 should be sufficient that little gap is left between the roller side wall and the edge of lands 19 and 20. Another criterion for roller width is that it be at least as wide as the hose 40 when the hose is in a flattened position. Thus, resilient hose 40 is maintained somewhat centered under the roller and because of the closely fitting parts cannot be caught or jammed between moving parts.

Thus by rotating the drive shaft 30, the roller 55 travels along the length of resilient hose 40 pinching or deforming shut that portion of the hose located under the roller. As previously mentioned, the rotation of shaft 30 is limited to a prescribed arc. By positioning the resilient hose well within the limits of the resilient roller travel, only the central portion of the hose is deformed. As a result of the deformation, air contained in the hose between the pinched off portion and the plug 42 is displaced through the end plug and small diameter conduit 45 into the upper end of fluid container C by means of an air inlet port 60. As a result of such air addition, a precise portion of the fluid contained within container C is effectively displaced by an equal amount of air to release an equal amount of fluid through the narrow diameter outlet orifice 61 provided at the lower end of container C.

By loosely mounting resilient hose 40 to extend along the periphery of smooth bore 18 any creep which occurs due to the deformation of the resilient hose is compensated for by the hose's ability to inch or slide along the bore surface. This creeping does not cause cumulative error since there is only one roller which will correct any creep when the direction of roller travel is reversed to return the hose in the initial position.

When reversing the direction of roller travel, the metering pump can be used to draw a precise quantity of fluid into vessel C. This suction action results from the slight vacuum force created within resilient hose 40 as the volume of the space between end plug 42 and roller 55 increases. The resilient nature of the hose material springs the hose back to the fully open position after the roller passes by thereby creating the slight vacuum necessary to draw the air. Again, the amount of fluid drawn into vessel C will be precisely determined by the calibration on dial 33. And, as a result, no markings or scales are needed on the vessel.

Although one embodiment of this invention has been described in detail for purposes of illustration, it should be noted that other changes can be made in the details of the illlustrated embodiment as is obvious to a man ordinarily skilled in the art without departing from the scope of the invention as defined in the appended claim.

What is claimed is:

A device for metering precise quantities of fluid comprising: a hollow body having a fluid orifice and an air inlet port of reduced diameters communicating with a main fluid storing of relatively large diameter; a cylindrical member having a smooth inner bore; end plates covering each end of said cylindrical member; a resilient hose mounted within said cylindrical member and extending most of the way around the bore circumference; a shielded conduit extending through an aperture in the cylindrical wall and connecting with said resilient hose at one end and with the air inlet port of said hollow body at the other end to provide a passageway for air communication therebetween, the conduit passageway being no greater than 1/10 the size of the resilient hose diameter; a shaft rotatably mounted to extend coaxial within the cylindrical member; arm means secured to extend radially from said shaft;

cylindrical roller means rotatably mounted on the end of said arm having an axis of rotation paralleling the plane of said cylindrical bore with the roller face being spaced from the bore surface a distance slightly less than twice the hose wall thickness, said roller being adapted to travel along said resilient hose to progressively flatten short lengths thereof whereby air contained within said hose is forced through said conduit to create a force on the fluid for relative displacement of a precise quantity of fluid through the fluid orifice; and stop means connected to limit shaft rotation to an arc less than the arc subtended by said resilient hose to stop said roller before it overruns either end thereof.

References Cited by the Examiner

UNITED STATES PATENTS

| | | | |
|---|---|---|---|
| 1,845,479 | 2/1932 | Carpenter | 103—149 |
| 2,488,573 | 11/1949 | Wood. | |
| 3,141,393 | 8/1964 | De Seguin des Hons. | |
| 3,175,507 | 3/1965 | Rydberg | 103—149 |

SAMUEL ROTHBERG, *Primary Examiner.*

LAVERNE D. GEIGER, *Examiner.*

E. EARLS, *Assistant Examiner.*